United States Patent [19]
Belopolsky et al.

[11] Patent Number: 5,530,783
[45] Date of Patent: Jun. 25, 1996

[54] BACKPLANE OPTICAL FIBER CONNECTOR FOR ENGAGING BOARDS OF DIFFERENT THICKNESSES AND METHOD OF USE

[75] Inventors: Yakov Belopolsky, Harrisburg; Stuart C. Stoner, Lewisberry, both of Pa.

[73] Assignee: Berg Technology, Inc., Reno, Nev.

[21] Appl. No.: 298,940

[22] Filed: Aug. 31, 1994

[51] Int. Cl.$^6$ .................................................. G02B 6/36
[52] U.S. Cl. .................................... 385/53; 385/60; 385/64
[58] Field of Search ........................... 385/53, 55, 56, 385/60, 62, 63, 64, 70, 76; 439/610, 552, 554, 557

[56] References Cited

U.S. PATENT DOCUMENTS

| | | | |
|---|---|---|---|
| 2,800,698 | 7/1957 | Wood | 174/35 PS |
| 2,869,098 | 1/1959 | Sauer | 439/353 |
| 2,897,474 | 7/1959 | Heath | 439/554 |
| 3,144,292 | 8/1964 | Forney, Jr. | 439/610 |
| 3,183,297 | 5/1965 | Curtiss | 174/65 R |
| 3,569,933 | 3/1971 | Longenecker et al. | 340/458 |
| 3,654,382 | 4/1972 | Rubright | 174/153 G |
| 4,081,208 | 3/1978 | Meade | 385/75 |
| 4,257,028 | 3/1981 | Narozny et al. | 439/399 |
| 4,415,232 | 11/1983 | Caron | 385/84 |
| 4,627,683 | 12/1986 | Shimomura | 439/557 |
| 4,710,852 | 12/1987 | Keen | 361/717 |
| 4,721,473 | 1/1988 | DelGuidice et al. | 439/79 |
| 4,881,792 | 11/1989 | Alameel et al. | 385/56 |
| 4,944,212 | 7/1990 | van der Vegte et al. | 385/64 |
| 4,944,568 | 7/1990 | Danbach et al. | 385/88 |
| 5,091,991 | 2/1992 | Briggs et al. | 385/82 |
| 5,108,312 | 4/1992 | Sampson | 439/607 |
| 5,138,679 | 8/1992 | Edwards et al. | 385/90 |
| 5,151,961 | 9/1992 | Hvezda et al. | 385/60 |
| 5,155,784 | 10/1992 | Knott | 385/88 |
| 5,171,164 | 12/1992 | O'Neil et al. | 439/552 |
| 5,238,427 | 8/1993 | Fry et al. | 439/557 |
| 5,266,050 | 11/1993 | O'Neil et al. | 439/552 |
| 5,274,729 | 12/1993 | King et al. | 385/134 |
| 5,317,663 | 5/1994 | Beard et al. | 385/70 |

Primary Examiner—Rodney B. Bovernick
Assistant Examiner—Hemang Sunghavi
Attorney, Agent, or Firm—Daniel J. Long; M. Richard Page

[57] ABSTRACT

Disclosed is a fiber optic backplane connector in which there are a plurality of axially spaced circuit board engaging spring on one side of the exterior housing. By means of this arrangement a single connector is engageable with a number of thicknesses of circuit board. Also disclosed are two resilient metal arms which extend from a metal plate on one side of the connector to engage the medial flange to enable the connector to be assembled without ultrasonic welding. A method for using this connector to connect fiber optic cables as well as to dissipate static electrical charges therein is also disclosed.

27 Claims, 4 Drawing Sheets

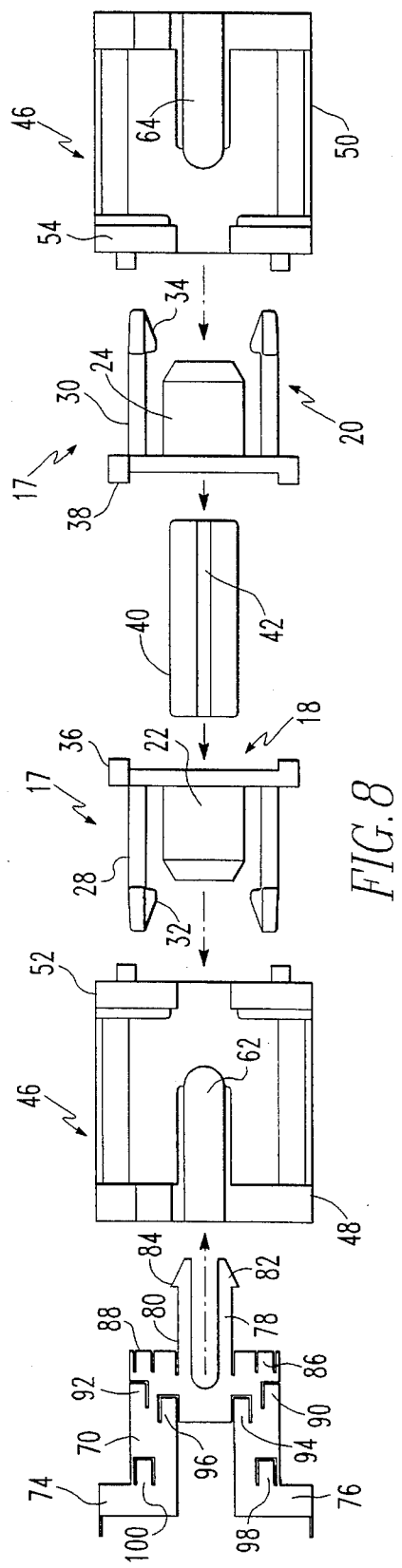
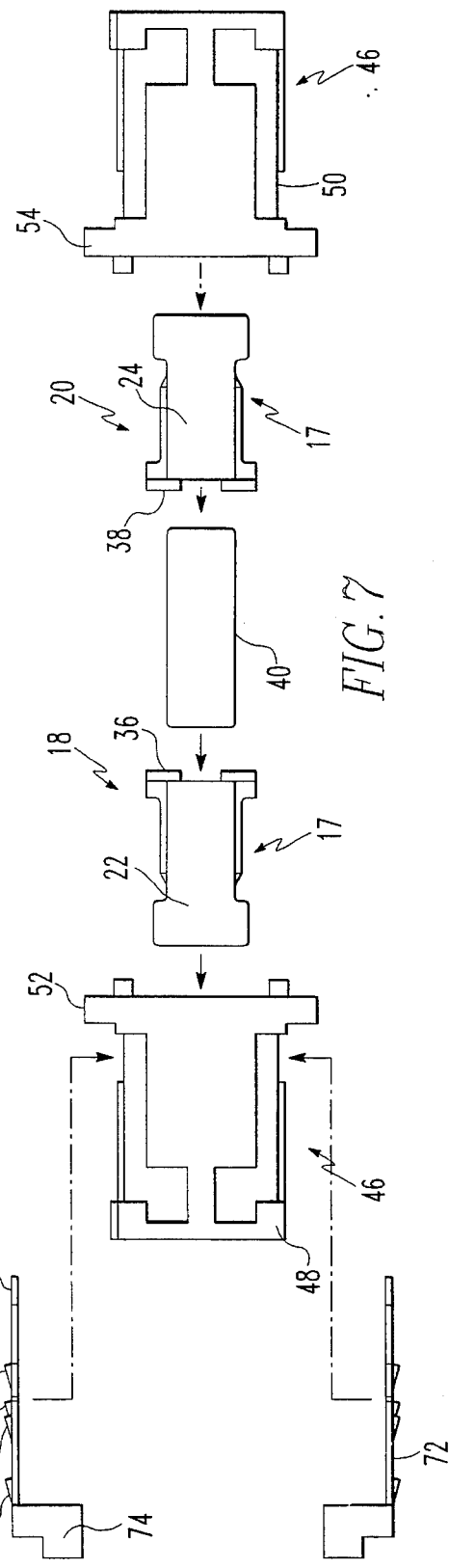

5,530,783

BACKPLANE OPTICAL FIBER CONNECTOR FOR ENGAGING BOARDS OF DIFFERENT THICKNESSES AND METHOD OF USE

BACKGROUND OF THE INVENTION

1. Field of the Invention

The present invention relates to optical waveguides and more particularly to connectors for optical fibers.

2. Brief Description of Prior Developments

The use of optical fibers has revolutionized communications and consequently that use has greatly increased over the past several years. As part of that use it has become increasingly necessary to connect optical fiber cables to circuit boards by means of backplane connectors. Circuit boards are conventionally manufactured in a variety of thicknesses. Consequently it has been necessary to provide a separate connector for each circuit board thickness. A need, therefore, exists for a type of backplane connector which can be used on a wide variety of circuit board thicknesses.

Another disadvantage of the backplane connectors which have heretofore been used to connect fiber optic cables to circuit boards is that the exterior housings of such connectors have conventionally been made in two sections and the need has existed to ultrasonically weld or adhesively bond those sections to each other. This additional step of ultrasonically welding the exterior housings is time consuming and expensive. The need, therefore, exists for a fiber optic connector which can be manufactured without this step.

Furthermore, while fiber optical cables are not conductive, they can accumulate significant charges of static electricity. Such charges can in turn discharge through the system and can damage sensitive electrical components. A still further disadvantage of the prior art systems is, therefore, that they provide no means for discharging static charges or power electromagnetic interference (EMI) pulses to a safe grounded path. A need for providing such a capability accordingly exists.

SUMMARY OF THE INVENTION

The connector of the present invention includes a central adapter in which two optical cables are coaxially connected. There is also an exterior housing which has two similar ends. The first of these ends extends into an aperture in the circuit board. The second end extends outwardly from this aperture. Each of these sections has a terminal flange which adjoins with the flange of the other section to form a medial flange for the entire connector. On the exterior surface of the first end there are a plurality of axially spaced springs which engage the circuit board on the periphery of the aperture. Through the use of this succession of spaced springs it is possible to use this same backplane connector to engage a variety of circuit board thicknesses. These springs are preferably mounted on a pair of opposed metal plates positioned on the opposed lateral sides of this first element. Each of these plates engages the exterior surface of the first end by means of a pair of clips.

Two resilient arms also extend forward from each of these metal plates to engage the flange on the second end. The need to ultrasonically weld or adhesively bond the two ends of the exterior housing is thereby eliminated.

Another feature of the connector of the present invention is that the metal plates on the peripheral surface of the first end allow electrostatic charges in the fiber optical cables to be discharged.

BRIEF DESCRIPTION OF THE DRAWINGS

The backplane connector of the present invention is further described with reference to the accompanying drawings in which:

FIG. 7 is an exploded plan view of the connector shown in FIG. 1; and

FIG. 8 is an exploded side view of the connector shown in FIG. 1.

DETAILED DESCRIPTION OF THE PREFERRED EMBODIMENT

Figure 1:
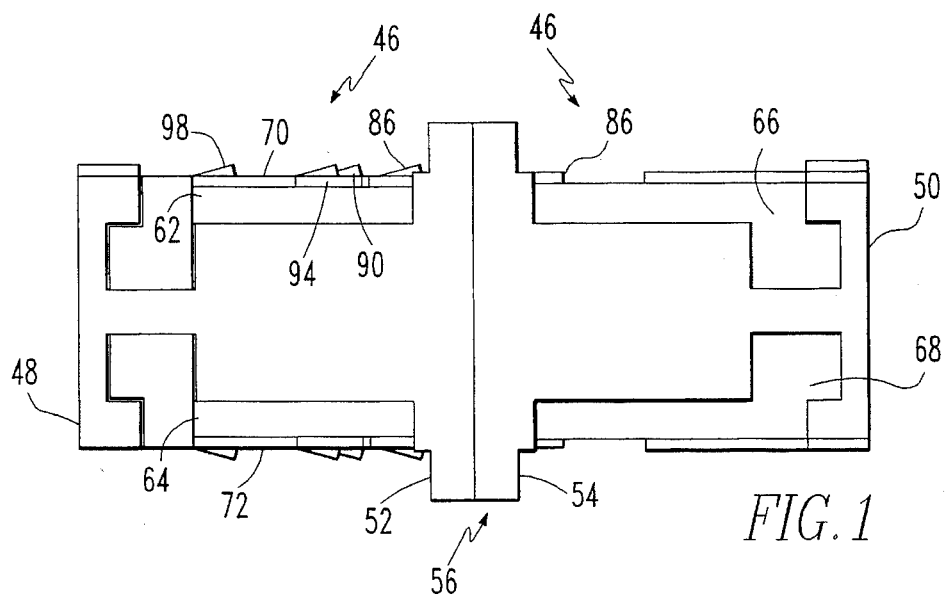
FIG. 1 is a plan view of a preferred embodiment of the connector of the present invention.
Figure 2:
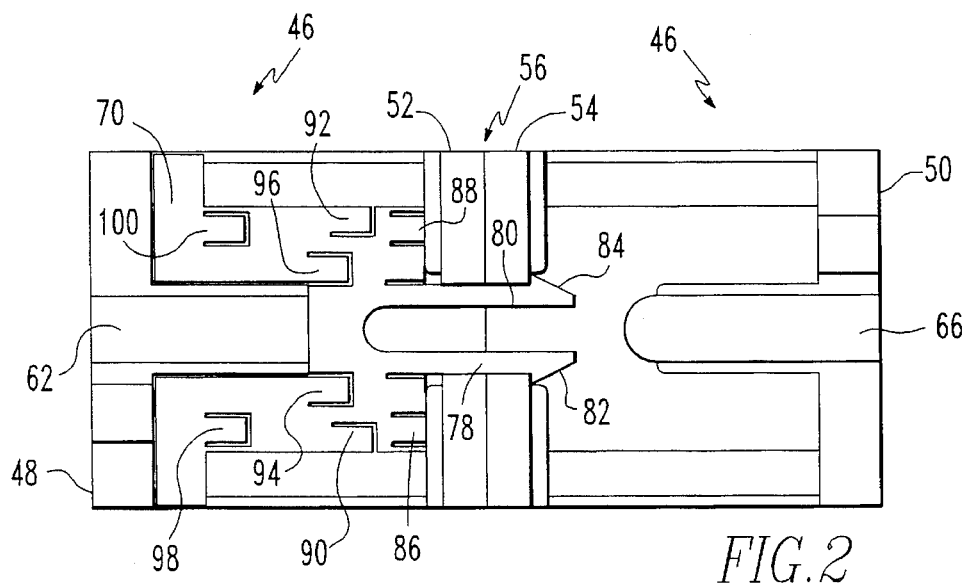
FIG. 2 is a side elevational view of the connector shown in FIG. 1.
Figure 3:
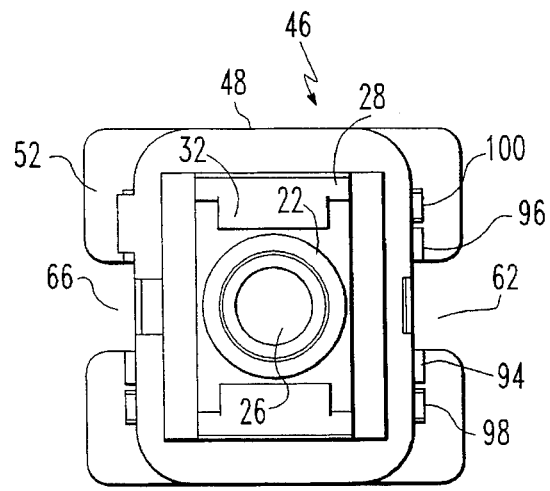
FIG. 3 is an end view of the connector shown in FIG. 1.
Figure 4:
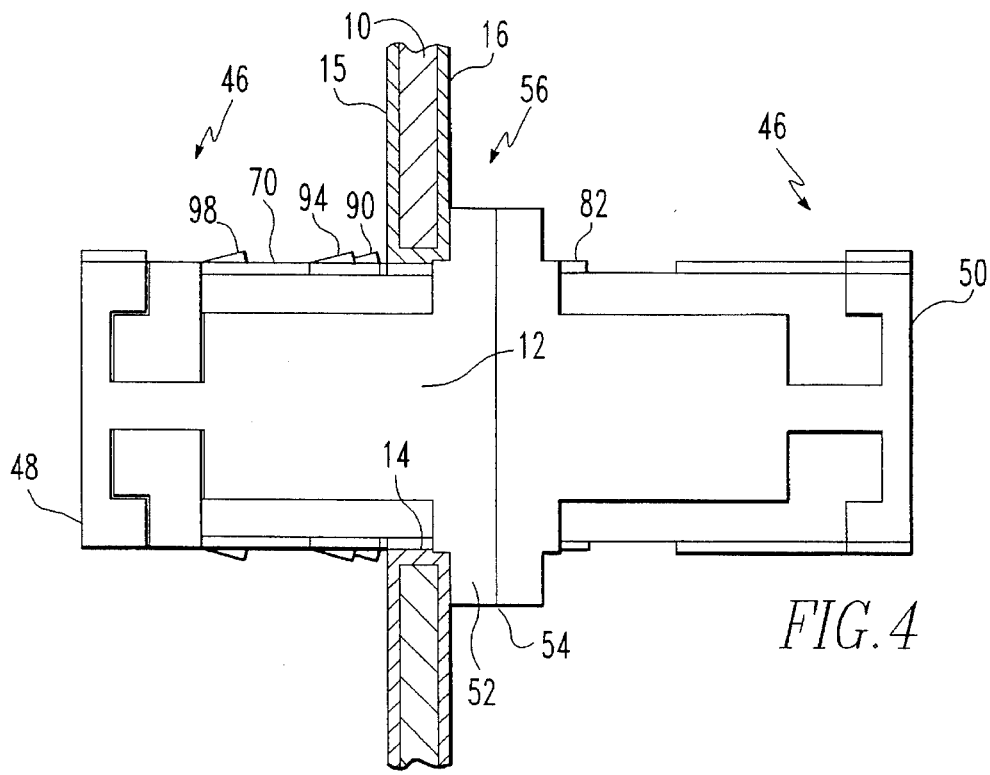
FIG. 4 is a plan view of the connector similar to that shown in FIG. 1 in which the engagement to the circuit board is illustrated.
Figure 5:
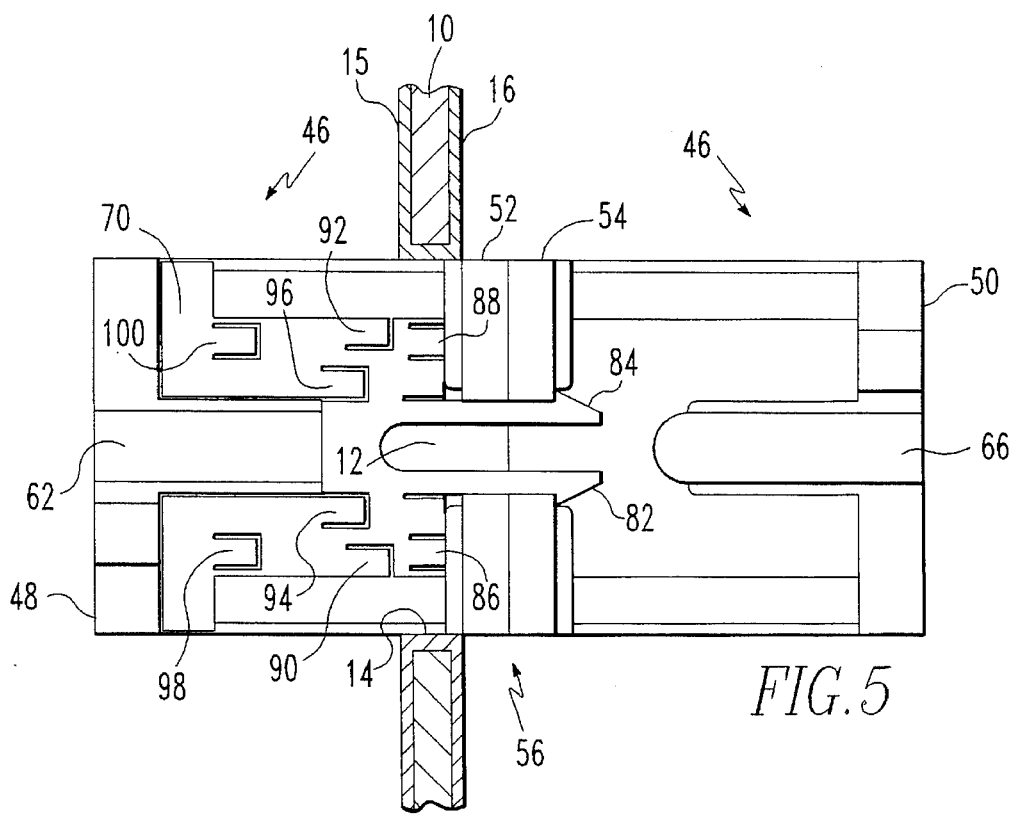
FIG. 5 is a side elevational view of the connector shown in FIG. 4.
Figure 6:
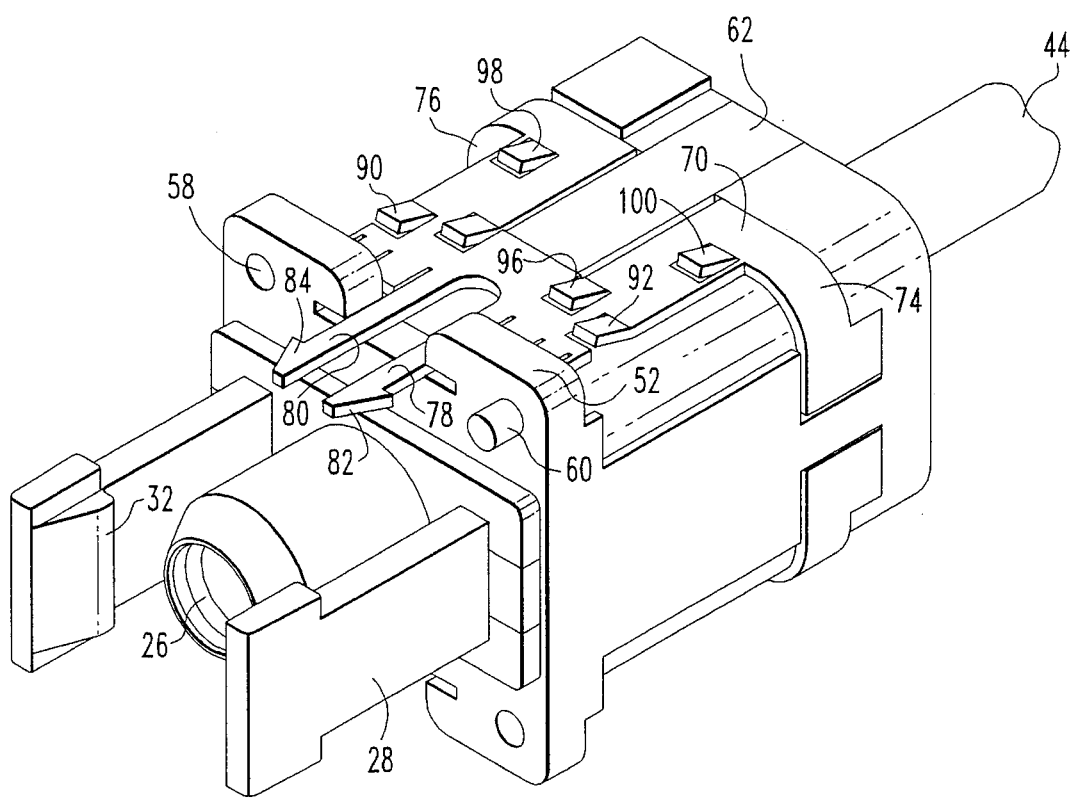
FIG. 6 is a prospective fragmented view of part of the connector shown in FIG. 1.

Referring to the drawings, the backplane connector of the present invention engages a circuit board 10 having an aperture 12 with a metalized peripheral edge 14. The circuit board will ordinarily be a fiberglass reinforced polymer and will have opposed metallized surfaces 15 and 16 (FIGS. 4 and 5). Referring particularly to FIGS. 7 and 8, it will be seen that this connector contains a central adapter shown generally at numeral 17 which includes a first half 18 and a substantially identical second half 20. Each of these halves has a cylinder respectively 22 and 24 which engage end to end to form an axial bore 26 (FIG. 6). Each of these halves also has a pair of flexible locking arms respectively as at 28 and 30 which have terminal clip protrusions respectively as at 32 and 34. Each of these halves also has a flange respectively at 36 and 38 which engage end to end. Within the axial bore of the cylinders there is a ceramic and preferably zirconium cylindrical ferrule 40 having a slot 42. The optical cables as at 44 (FIG. 6) are connected within this ferrule.

An exterior housing shown generally at numeral 46 surrounds the central adapter. This exterior housing is made up of a first end half 48 and the second end half 50. Each of these ends is generally tubular and has a terminal flange respectively at 52 and 54. These flanges adjoin to form a combined medial flange 56. Each of these flanges has a number of transverse apertures at 58 (FIG. 6) by means of which the flanges are located by means of pins at 60 (FIG. 6). In the first end there are opposed lateral recesses 62 and 64. Similarly, in the second end there are lateral recesses 66 and 68. The exterior housing is preferably a thermoplastic material having 15 to 30 percent fiberglass insert.

On both sides of the first end of the exterior housing there are metal spring plates 70 and 72 which are held on the surface of the end by means of resilient clips as at 74 and 76. Extending forward of the metal spring plates there are resilient extensions as at 78 and 80 which have terminal prongs 82 and 84. These terminal prongs engage the flange 54 on the second end of the exterior housing. There are similar resilient extension arms on the metal plate 72 which also engage flange 54 on the second end. By means of these resilient extension arms, the two end halves are connected together without need of ultrasonic welding or adhesive bonding. On the metal spring plate 70 there are a first pair of outwardly biased springs 86 and 88. Axially spaced from this first pair of springs there is a second pair of springs 90 and 92. Axially spaced from the second pair of springs there is a third pair of springs 94 end 96. Finally, still further axially spaced there is a fourth pair of springs 98 and 100. It will be appreciated that each of these pairs of springs may be considered to function as a single circuit board engagement means. These pairs of springs will preferably be axially spaced from the medial flange to accommodate common thicknesses of circuit boards. For example, such axial displacements will preferably be 1.4 mm to 1.8 mm and more preferably be 1.6 mm, 2.2 mm to 2.6 mm and more preferably 2.4 mm, 3.0 mm to 3.4 mm and more preferably 3.2 mm and 3.8 mm to 4.2 mm and more preferably 4.0 mm. Additional spring pairs may be preferably positioned at multiples of 0.6 mm to 1.0 mm and more preferably 0.8 mm.

Referring particularly to FIGS. 4 and 5, it will be seen that these springs are resiliently sprung to be compressible inwardly toward the peripheral surface of the first end. When the circuit board is of a thickness to extend beyond their axial position as the circuit abuts against the medial flange, it will compress these springs. That is, when the circuit board is of a thickness of less than the distance between the flange and the first pair of springs, it will be retained in position by the first pair of springs. When it is thicker than the distance between the medial flange and the first pair of springs, it will inwardly compress the first pair of springs and be retained in position by the second pair of springs. When the board is thicker than the distance between the medial flange and the second pair of springs, it will compress the first and second pair of springs and be retained in position by the third pair of springs. Finally, if the board is thicker than the distance between the first pair of springs and the medial flange, it will compress the first, second and third pair of springs and be retained in position by the fourth pair of springs.

It will be appreciated that a method for connecting fiber optic cables at a circuit board is also disclosed. Those pairs of springs which have axial displacements from the medial flange which are less than the thickness of the circuit board being engaged will be compressed by the board. The circuit board is thus engaged by the pair of springs having the smallest axial displacement from the medial flange which is greater than the thickness of the circuit board.

Those skilled in the art will also appreciate that a method for correcting two fiber optic cables at a circuit board has also been described. The fiber optic cables are positioned in connecting coaxial alignment in the axial bore of a central adapter. A backplane connector is formed by positioning the central adapter in interior coaxial relation with the exterior housing. The first end of the housing is then positioned so that it passes through the transverse aperture in the circuit board with its peripheral surface in generally abutting relation to the peripheral edge. The medial flange is positioned in generally side by side abutting relation with the circuit board such that there are a plurality of axially displacements between the medial flange and each of the circuit board engagement means. The circuit board is then engaged with the circuit board engagement means which has the smallest axial displacement greater than the thickness of the circuit board.

It will also be appreciated that a means of discharging a static electrical charge is also described when a metal plate or other electrical conductive means is positioned over the peripheral surface of the first end.

It will be understood that a means has been described for connecting optical fiber cables to circuit boards in which a single connector can be used to connect cables to a large variety of circuit board thicknesses.

It will also be understood that a backplane connector for connecting fiber optic cables to circuit boards which can be assembled without need of ultrasonic welding has also been described.

Additionally, it will be understood that a backplane connector for connecting fiber optic cables to circuit boards which use the capacity to discharge accumulated charges of static electricity has been described.

Although the invention has been described with a certain degree of particularity, it is to be understood that the present disclosure has been made only as an example and that the scope of the invention is defined by what is hereafter claimed.

What is claimed is:

1. In a fiber optic backplane connector for connecting fiber optic cables at a circuit board having a thickness and said circuit board which has a transverse aperture, having a peripheral edge, said connector comprising (a) a central adapter passing through said aperture in the circuit board and having an axial bore for holding two fiber optic cables in alignment and (b) an exterior housing coaxially surrounding the adapter and having first and second ends each having peripheral surfaces and a medial flange interposed between said first and second ends and said exterior housing being positioned such that the first end passes through the transverse aperture in the circuit board, in generally abutting relationship between its peripheral surface and peripheral edge of the transverse aperture and the medial flange is positioned in generally side by side abutting relation with the board wherein the improvement comprises a first and a second axially spaced board engaging means extending from the peripheral surface of the first end of the exterior housing to allow the backplane connection to engage boards of different thicknesses.

2. The backplane connector of claim 1 wherein the first and second axially spaced board engaging means comprises a spring means.

3. The backplane connector of claim 2 wherein the spring means extend rearwardly and upwardly from the peripheral surface of the first end of the exterior housing.

4. The backplane connector of claim 3 wherein the spring means are resiliently sprung to be compressible inwardly toward the peripheral surface of the first end when the backplane connector is engaged with a board.

5. The backplane connector of claim 4 wherein there is a first axial displacement between the medial flange and the first spring means and the board retained by the first spring means when the thickness of the board is less than said first axial displacement.

6. The backplane connector of claim 4 wherein there is a first axial displacement between the flange and the first spring means and the circuit board is retained by the first spring means when the thickness of the board is less than said first axial displacement.

7. The backplane connector of claim 5 wherein there is a second axial displacement between the flange and the second spring means and the circuit board is retained by the second spring means when the thickness of the circuit board is greater than the first axial displacement but less than the second axial displacement.

8. The backplane connector of claim 5 wherein the first axial displacement is from about 1.4 mm to about 1.8 mm.

9. The backplane connector of claim 5 wherein there is a second axial displacement between the flange and the second spring means and the board is retained by the second spring means when the thickness of the board is greater than the first axial displacement but less than the second axial displacement.

10. The backplane connector of claim 9 wherein there is at least a third spring means which is axially spaced on the peripheral surface from the first and second spring means.

11. The backplane connector of claim 10 wherein there is a third axial displacement between the flange and the third spring means and the circuit board retained by the third spring means when the thickness of the circuit board is greater than the second axial displacement but less than said third axial displacement.

12. The backplane connector of claim 11 wherein the third axial displacement is from about 3.0 mm to about 3.4 mm.

13. The backplane connector of claim 9 wherein there are a plurality of additional spring means which are axially spaced from one another and the first and second spring means on the peripheral surface.

14. The backplane connector of claim 13 wherein there are a plurality of axial displacements between the flange and each of the spring means and the circuit board is retained by the spring means which was the smallest axial displacement greater than the thickness of the circuit board.

15. The backplane connector of claim 14 wherein one of said plurality of axial displacements is from about 3.8 mm to about 4.2 mm.

16. The backplane connector of claim 14 wherein said plurality of axial displacements are multiples of from about 0.6 mm to about 1.0 mm.

17. The backplane connector of claim 9 wherein the second axial displacement is from about 2.7 mm to about 2.6 mm.

18. The backplane connector of claim 2 wherein the spring means projects from a metal plate mounted on the peripheral surface of the first end.

19. The backplane connector of claim 18 wherein an axial connection means extend from the metal plate to engage the second end of the exterior housing.

20. The backplane connector of claim 19 wherein the axial connection means comprise a pair of resilient arms which extend axially from the metal plate and which have transverse prongs that engage the medial flange.

21. The backplane connector of claim 18 wherein the spring means project from a pair of essentially similar metal plates mounted in opposed relation on the peripheral surface to the first end.

22. The backplane connector of claim 1 wherein axial connection means extend from the first end to the second end of the exterior housing.

23. The backplane connector of claim 1 wherein the fiber optic cables are coaxially aligned.

24. A method for connecting two fiber optic cables at a circuit board having a thickness and a transverse aperture with a peripheral edge comprising the steps of positioning the fiber optic cables in connecting alignment in an axial bore in a central adapter and forming a backplane connector by positioning said central adapter in interior coaxial relation with an exterior housing having a first end and a second end each having peripheral surfaces and there being on the peripheral surface of said first end a plurality of axially spaced circuit board engagement means each extending from its peripheral surface and then positioning the resultant backplane connector such that its first end passes through the transverse aperture in the circuit board with its peripheral surface in generally abutting relation to the peripheral edge thereof and the medial flange is positioned in generally side by side abutting relation with the circuit board such that there are a plurality of axially displacements between the medial flange and each of the circuit board engagement means and then engaging the circuit board with the circuit board engagement means which has the smallest axial displacement greater than the thickness of the circuit board.

25. The method of claim 24 wherein the circuit board engagement means are spring means.

26. A method for connecting two fiber optic cables at a circuit board having a thickness and a transverse aperture with a peripheral edge comprising the steps of positioning the fiber optic cables in connecting coaxial alignment in an axial bore in a central adapter and forming a backplane connector by positioning said central adapter in interior coaxial relation with an exterior housing having a first end and a second end each having peripheral surfaces and there being an electrical conductive means on the peripheral surface of the first end and a medial flange and said first end having at least one circuit board engagement means each extending from metal plate mounted on the peripheral surface and then positioning the resultant backplane connector such that its first end passes through the transverse aperture in the circuit board with its peripheral surface in generally abutting relation to the peripheral edge thereof and the medial flange is positioned in generally side by side abutting relation with the circuit board and then engaging the circuit board with the circuit board engagement means and generally simultaneously discharging accumulated static electrical charge.

27. The method of claim 26 wherein there are a plurality of axially spaced circuit board engagement means extending from the metal plate mounted on the peripheral surface of first end and the medial flange is positioned in generally side by side abutting relation with the circuit board such that there are a plurality of axially displacements between the medial flange and each of the circuit board engagement means and then engaging the circuit board with the circuit board engagement means which has the smallest axial displacement greater than the thickness of the circuit board.

* * * * *